(12) United States Patent
Park et al.

(10) Patent No.: US 11,556,041 B2
(45) Date of Patent: Jan. 17, 2023

(54) ELECTRO-OPTIC MODULATOR

(71) Applicant: ELECTRONICS AND TELECOMMUNICATIONS RESEARCH INSTITUTE, Daejeon (KR)

(72) Inventors: Jaegyu Park, Daejeon (KR); Sang-Pil Han, Daejeon (KR); Sungil Kim, Daejeon (KR); Minhyup Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/485,321

(22) Filed: Sep. 24, 2021

(65) Prior Publication Data

US 2022/0163864 A1 May 26, 2022

(30) Foreign Application Priority Data

Nov. 25, 2020 (KR) .................. 10-2020-0160200

(51) Int. Cl.
*G02F 1/225* (2006.01)
*G02F 1/035* (2006.01)

(52) U.S. Cl.
CPC .......... *G02F 1/2255* (2013.01); *G02F 1/0356* (2013.01)

(58) Field of Classification Search
CPC .... G02F 1/2255; G02F 1/0356; G02F 1/0316; G02F 1/035
See application file for complete search history.

(56) References Cited

U.S. PATENT DOCUMENTS

| 5,138,480 | A | 8/1992 | Dolfi et al. |
| 5,442,719 | A | 8/1995 | Chang et al. |
| 6,400,494 | B1 | 6/2002 | Kondo et al. |
| 7,382,942 | B2 | 6/2008 | Mitomi et al. |
| 2003/0031400 | A1* | 2/2003 | Pruneri ............... G02F 1/2255 385/14 |
| 2012/0027336 | A1 | 2/2012 | Park et al. |
| 2016/0299403 | A1 | 10/2016 | Lee et al. |

OTHER PUBLICATIONS

Cheng Wang et al., "Integrated lithium niobate electro-optic modulators operating at CMOS-compatible voltages", Nature, vol. 562, Oct. 4, 2018, p. 101 (13).
Mingbo He et al., "High-performance hybrid silicon and lithium niobate Mach-Zehnder modulators for 100 Gbit s-1 and beyond", Nature Photonics, vol. 13, May 2019, pp. 359-364.

* cited by examiner

*Primary Examiner* — John Bedtelyon
(74) *Attorney, Agent, or Firm* — Rabin & Berdo, P.C.

(57) ABSTRACT

Disclosed is an electro-optic modulator. The electro-optic modulator includes a lower clad layer disposed on a substrate, an optical waveguide disposed on the lower clad layer, traveling-wave electrodes respectively disposed on both sides of the optical waveguide and each having a first distance to the optical waveguide, and ferroelectric blocks disposed between the traveling-wave electrodes and the lower clad layer and each having a second distance to the optical waveguide, which is less than the first distance.

16 Claims, 6 Drawing Sheets

ELECTRO-OPTIC MODULATOR

CROSS-REFERENCE TO RELATED APPLICATIONS

This U.S. non-provisional patent application claims priority under 35 U.S.C. § 119 of Korean Patent Application No. 10-2020-0160200, filed on Nov. 25, 2020, the entire contents of which are hereby incorporated by reference.

BACKGROUND

The present disclosure herein relates to an optical device, and more particularly, to an electro-optic modulator.

In recent years, a development demand of a high speed data process technology has increased in a wire and wireless communication field as a calculation capacity and a data capacity of computers, smart devices, and various multimedia remarkably increase. In correspondence to this matter, national investment for developing a data communication module, which is a next-generation communication (ex. 5G and 6G), micro-sized, ultrahigh speed, low power consumption, and low cost data communication module, has been made, and related researches and product developments are in process at a lot of research institutions and companies. Among the researches and developments, a micro-sized, high-speed, and low power consumption electro-optic modulator has been actively researched and developed.

SUMMARY

The present disclosure provides an electro-optic modulator capable of increasing an intensity of an electric field provided to an optical waveguide.

An embodiment of the inventive concept provides an electro-optic modulator including: a lower clad layer disposed on a substrate; an optical waveguide disposed on the lower clad layer; traveling-wave electrodes respectively disposed on both sides of the optical waveguide, each of the traveling-wave electrodes having a first distance to the optical waveguide; and ferroelectric blocks disposed between the traveling-wave electrodes and the lower clad layer, each of the ferroelectric blocks having a second distance less than the first distance with respective to the optical waveguide.

In an embodiment, each of the ferroelectric blocks may have a protruding portion having a top surface exposed from each of the traveling-wave electrodes.

In an embodiment, the protruding portion may have a first width corresponding to a difference between the first distance and the second distance.

In an embodiment, the first width may be about 0.4 μm to about 0.7 μm.

In an embodiment, the first distance may be about 1.5 μm to about 2.5 μm, and the second distance may be about 1.3 μm to about 1.6 μm.

In an embodiment, the protruding portion may have a width of about 0.4 μm to about 0.7 μm.

In an embodiment, the optical waveguide may have a second width less than the second distance.

In an embodiment, the second width may be about 0.5 μm to about 1.5 μm.

In an embodiment, each of the optical waveguide and the ferroelectric blocks may include $LiNbO_3$.

In an embodiment, the optical waveguide may include: an input waveguide; an output waveguide disposed opposite to the input waveguide; and branch waveguides that are branched from the input waveguide and coupled to the output waveguide, and the ferroelectric blocks may be disposed between the branch waveguides, each of the ferroelectric blocks respectively disposed at both sides of the branch waveguides.

In an embodiment, the traveling-wave electrodes may include: a signal electrode disposed between the branch waveguides; and ground electrodes respectively disposed at both outer sides of the branch waveguides.

In an embodiment, the electro-optic modulator may further include an upper clad layer disposed on the traveling-wave electrodes, the ferroelectric blocks, and the optical waveguide.

In an embodiment, the electro-optic modulator may further include direct current (DC) electrodes disposed adjacent to the traveling-wave electrodes, the DC electrodes respectively disposed at both sides of one of the branch waveguides.

In an embodiment, the electro-optic modulator may further include line electrodes disposed on the upper clad layer, and the line electrodes may include: first line electrodes connected to the signal electrode and the ground electrodes; and second line electrodes connected to the DC electrodes.

In an embodiment, the electro-optic modulator may further include resistors disposed on the first line electrodes and configured to connect the signal electrode with the first line electrodes each disposed at one side of each of the ground electrodes.

In an embodiment, the traveling-wave electrodes may each extend in a first direction, and each of the first line electrodes may have a linear structure extending in the first direction.

In an embodiment, the optical waveguide may include: an optical splitter disposed between the input waveguide and the branch waveguides; and an optical coupler disposed between the branch waveguides and the output waveguide.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
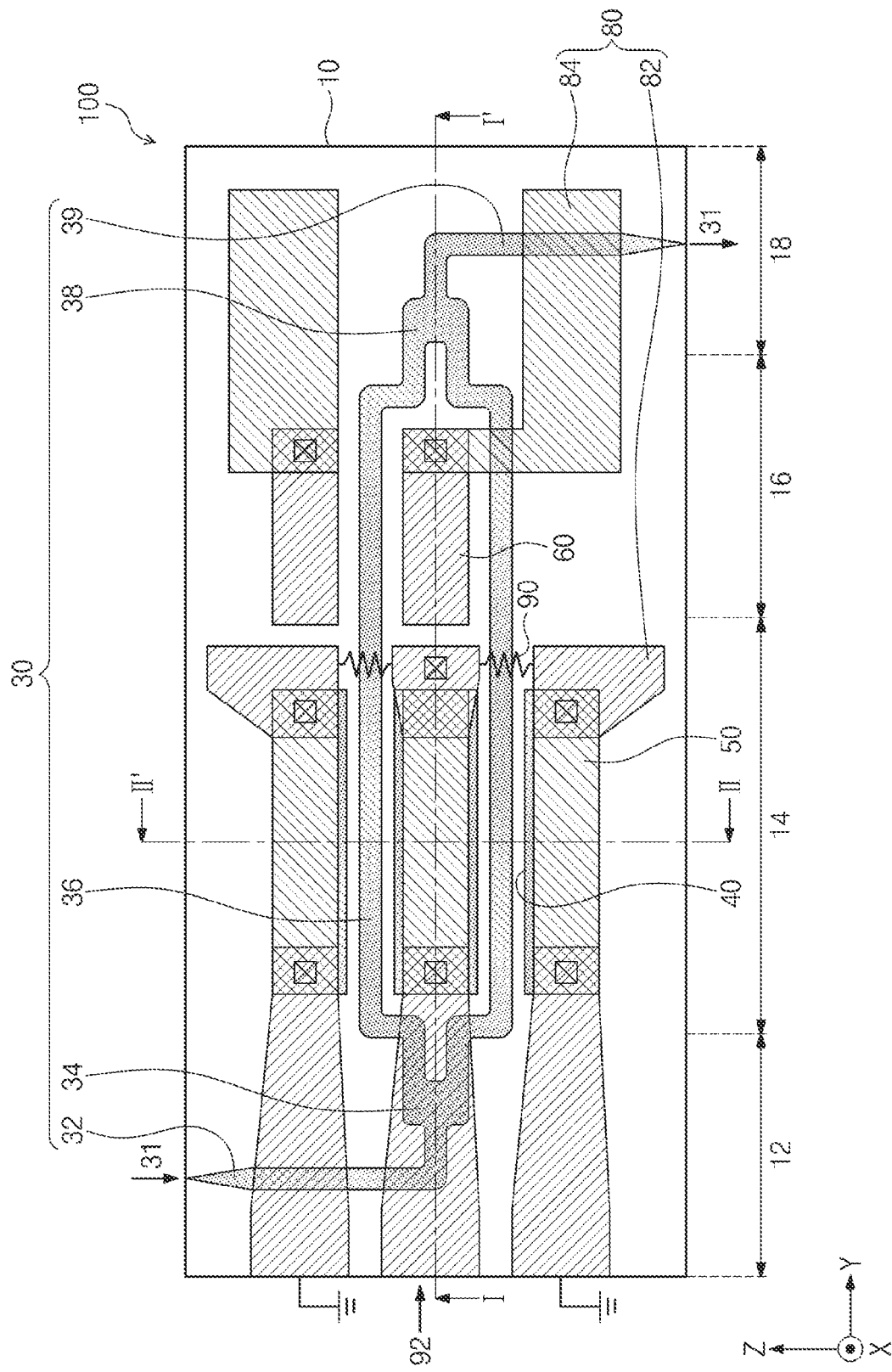
FIG. 1 plan view illustrating an example of an electro-optic modulator according to an embodiment of the inventive concept.

Exemplary embodiments of the present invention will be described in detail with reference to the accompanying drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present disclosure is only defined by scopes of claims. Like reference numerals refer to like elements throughout.

In the specification, the technical terms are used only for explaining a specific exemplary embodiment while not limiting the present invention. The terms of a singular form may include plural forms unless referred to the contrary. The meaning of 'comprises' and/or 'comprising' specifies a component, a step, an operation and/or an element does not exclude other components, steps, operations and/or elements. Also, in this specification, it will be understood that the terms such as the optical waveguide, the electrode, and the clad have the same meaning as generally understood in the optical communication field. Since preferred embodiments are provided below, the order of the reference numerals given in the description is not limited thereto.

Figure 2:
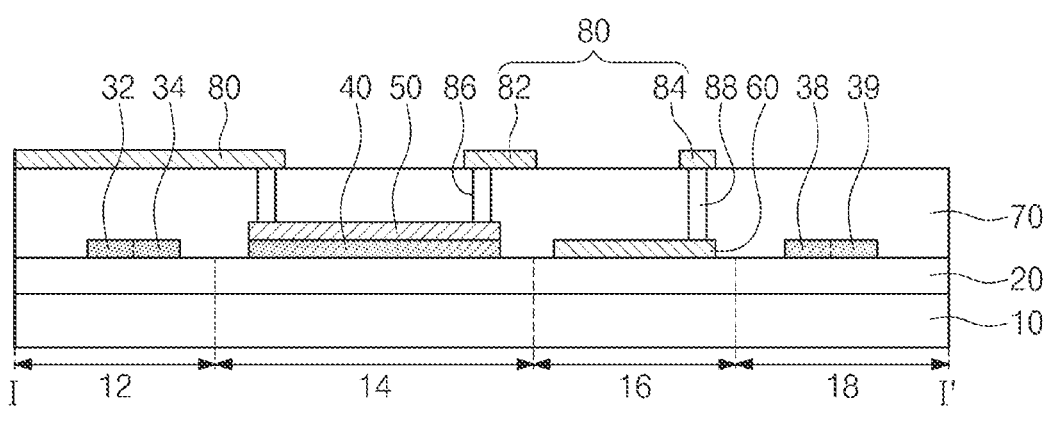
FIG. 2 is a cross-sectional view taken along line I-I' of FIG. 1.
Figure 2:
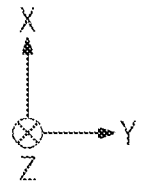
Figure 3:
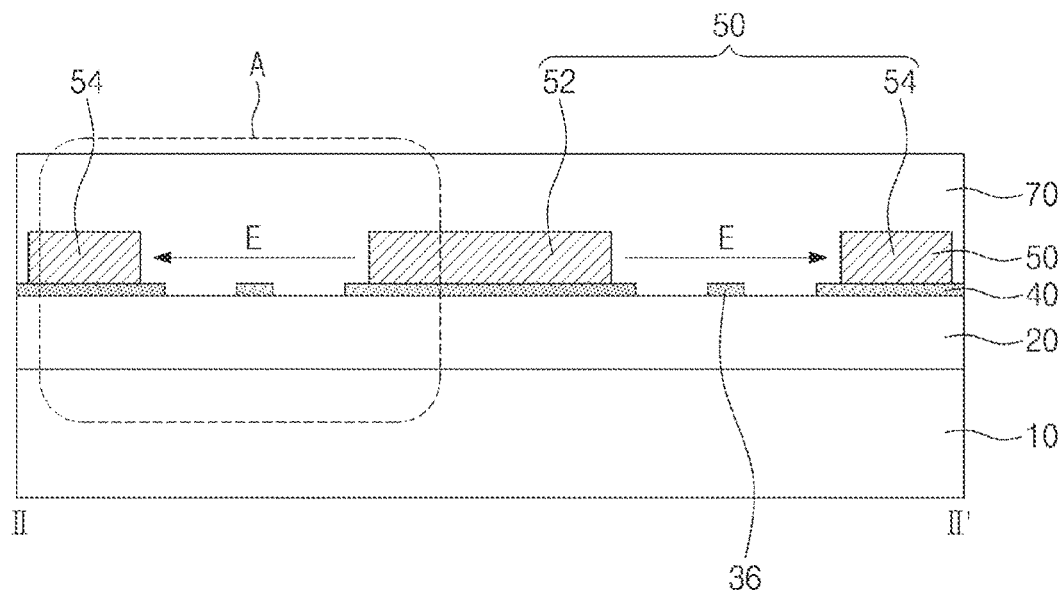
FIG. 3 is a cross-sectional view taken along line II-II' of FIG. 1.

FIG. 1 is a plan view illustrating an example of an electro-optic modulator 100 according to an embodiment of the inventive concept. FIG. 2 is a cross-sectional view taken along line I-I' of FIG. 1. FIG. 3 is a cross-sectional view taken along line II-II' of FIG. 1.

Referring to FIGS. 1 to 3, the electro-optic modulator 100 according to an embodiment of the inventive concept may be a mach-zehnder modulator. For example, the electro-optic modulator 100 according to an embodiment of the inventive concept may include a substrate 10, a lower clad layer 20, an optical waveguide 30, ferroelectric blocks 40, coplanar waveguide (CPW) traveling-wave electrodes 50, direct current (DC) electrodes 60, an upper clad layer 70, line electrodes 80, and resistors 90.

Referring to FIGS. 1 and 2, the substrate 10 may include a silicon wafer. Alternatively, the substrate 10 may include glass or a polymer compound. However, the embodiment of the inventive concept is not limited thereto. For example, the substrate 10 may have an input region 12, a radio frequency region 14, a direct current (DC) region 16, and an output region 18. The input region 12 may be provided at one side edge of the substrate 10. The radio frequency region 14 may be disposed between the input region 12 and the DC region 16. The DC region 16 may be disposed between the radio frequency region 14 and the output region 18. The output region 18 may be disposed at the other side edge of the substrate 10.

The lower clad layer 20 may be disposed on the substrate 10. The lower clad layer 20 may have a refractive index less than that of the optical waveguide 30. For example, the lower clad layer 20 may include a silicon oxide ($SiO_2$).

The optical waveguide 30 may be disposed on the lower clad layer 20. The optical waveguide 30 may have a refractive index greater than that of each of the lower clad layer 20 and the upper clad layer 70. The optical waveguide 30 may transmit and/or modulate an optical signal 31. For example, the optical waveguide 30 may include a ferroelectric material of $LiNbO_3$. Although not shown, the optical waveguide 30 may have polarizations in one direction. For example, the optical waveguide 30 may include an input waveguide 32, an optical splitter 34, branch waveguides 36, an optical coupler 38, and an output waveguide 39.

The input waveguide 32 may be disposed on the input region 12 of the substrate 10. The input waveguide 32 may be exposed to one side corner of the substrate 10 in a second direction Z. The input waveguide 32 may receive the optical signal 31 and provide the received optical signal to the optical splitter 34 and the branch waveguides 36.

The optical splitter 34 may be connected to the input waveguide 32. The optical splitter 34 may be connected between the input waveguide 32 and the branch waveguides 36. The optical splitter 34 may be disposed on the input region 12. The optical splitter 34 may separate the optical signal 31 and transmit the separated optical signals to the branch waveguides 36. For example, the optical splitter 34 may be a 50:50 beam splitter. The optical signal 31 may be separated with the same intensity and provided to the branch waveguides 36.

The branch waveguides 36 may be disposed on the radio frequency region 14 and the DC region 16 of the substrate 10. The branch waveguides 36 may each extend in a first direction Y in the radio frequency region 14 and the DC region 16. The branch waveguides 36 may be branched from the input waveguide 32 by the optical splitter 34. The branch waveguides 36 may be coupled to the output waveguide 39 by the optical coupler 38. The branch waveguides 36 may transmit the optical signal 31 to the optical coupler 38 and the output waveguide 39. The branch waveguides 36 may generate a phase difference of the optical signal 31 by using an electric field E between the CPW traveling-wave electrodes 50 and an electric field (not shown) between the DC electrodes 60.

The optical coupler 38 may connect the branch waveguides 36 to the output waveguide 39. The optical coupler 38 may interfere with the optical signal 31 having the phase difference in the branch waveguides 36 to provide the optical signals to the output waveguide 39. The optical signal 31 may be modulated by constructive interference and/or destructive interference in the optical coupler 38.

The output waveguide 39 may be disposed on the output region 18. The output waveguide 39 may be connected to the optical coupler 38. The output waveguide 39 may be exposed to the other side corner of the substrate 10 in the second direction Z. The output waveguide 39 may output the modulated optical signal 31 to the outside.

The ferroelectric blocks 40 may be disposed in the radio frequency region 14. The ferroelectric blocks 40 may each extend in the first direction Y. The ferroelectric blocks 40 may be disposed on the lower clad layer 30 between the branch waveguides 36. The ferroelectric blocks 40 may be disposed at both sides of the branch waveguides 36 and between the branch waveguides 36. That is, the ferroelectric blocks 40 may be disposed at both sides of each of the branch waveguides 36. The ferroelectric blocks 40 may include the same material as that of the optical waveguide 30. For example, the ferroelectric blocks 40 may include $LiNbO_3$.

The CPW traveling-wave electrodes 50 may be disposed on the ferroelectric blocks 40. The CPW traveling-wave electrodes 50 may each extend and/or be arranged in the first direction Y. Each of the CPW traveling-wave electrodes 50 may be a radio frequency electrode. When a RF signal 92 is provided to the CPW traveling-wave electrodes 50, the CPW traveling-wave electrodes 50 may provide the electric field E to branch waveguides 36 to change a refractive index of each of the branch waveguides 36 and change a phase of the optical signal 31. For example, the CPW traveling-wave electrodes 50 may include a signal electrode 52 and ground electrodes 54. The signal electrode 52 may be disposed between the branch waveguides 36. The ground electrodes 54 may be respectively disposed at both outer sides of the branch waveguides 36. The ground electrodes 54 may be grounded. When the RF signal 92 is provided to the signal electrode 52, the electric field E may be induced between the signal electrode 52 and the ground electrodes 54.

The electric field E may generate the phase difference of the optical signal 31 by changing the refractive index of each of the branch waveguides 36. The electric field E may be provided in opposite directions with respect to the branch waveguides 36. When the electric field E is provided in the opposite directions with respect to the branch waveguides 36, the branch waveguides 36 may have a refractive index difference caused by an interaction between polarizations thereof and the electric field E. The polarizations in the branch waveguides 36, which are made of the ferroelectric material, may be arranged in the same direction, and the electric field E may be provided in a direction opposite to the branch waveguides 36. That is, one of the branch waveguides 36 may have a refractive index that increases by the electric field E and the polarizations in the same direction, and the other of the branch waveguides 36 may have a refractive index that decreases by the electric field E and the polarizations in the opposite directions. The optical signal 31 may be modulated with a phase difference based on a variation of the refractive index.

The ferroelectric blocks 40 may increase an intensity of the electric field E between the CPW traveling-wave electrodes 50 and increase a variation speed of the refractive index of the branch waveguides 36. Also, the ferroelectric blocks 40 may concentrate the optical signal 31 in the branch waveguides 36.

Figure 4:
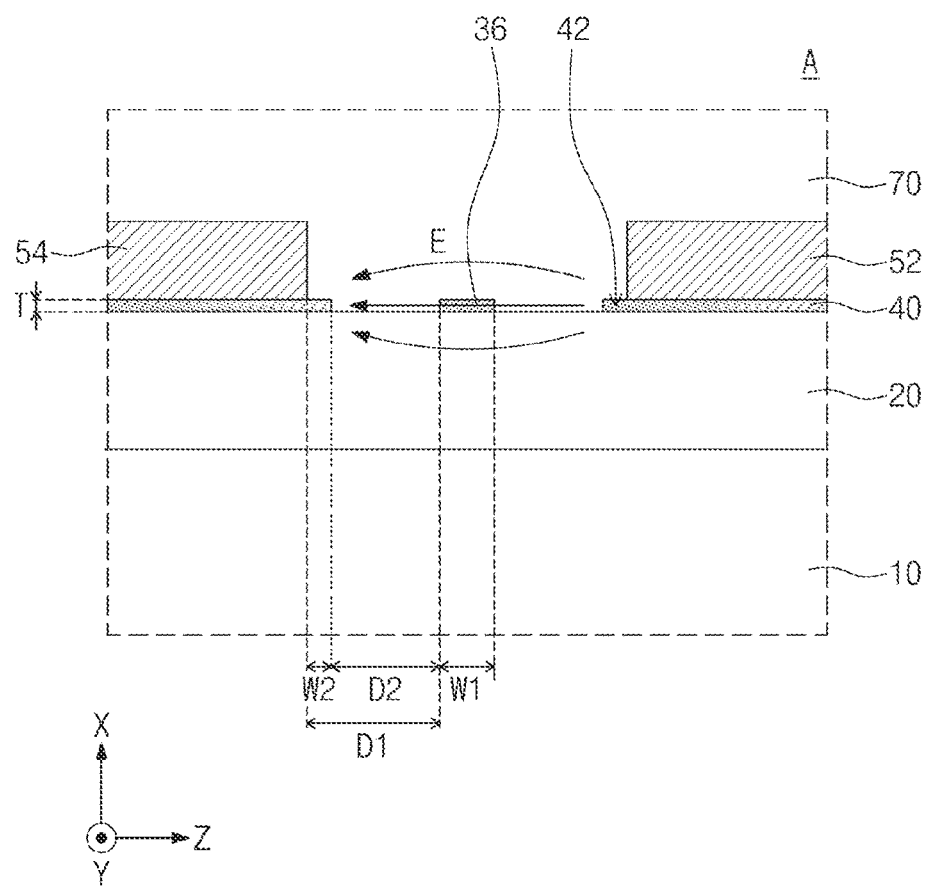
FIG. 4 is an enlarged view illustrating a portion A of FIG. 3.

FIG. 4 is an enlarged view illustrating a portion A of FIG. 3.

Referring to FIG. 4, the ferroelectric blocks 40 may be exposed from the CPW traveling-wave electrodes 50 and disposed closer to the branch waveguide 36 than the CPW traveling-wave electrodes 50. The CPW traveling-wave electrodes 50 may be disposed within a first distance D1 from the branch waveguide 36. For example, the first distance D1 may be about 1.5 µm to about 2.5 µm. For example, the first distance D1 may be about 2 µm.

The ferroelectric blocks 40 may be disposed within a second distance D2 from the branch waveguide 36. The second distance D2 may be less than the first distance D1. The ferroelectric blocks 40 disposed within the second distance D2 may act as a conductor to the branch waveguide 36 and/or the CPW traveling-wave electrodes 50. The ferroelectric blocks 40 may decrease the first distance D1 between the signal electrode 52 and the ground electrode 54 with respect to the branch waveguide 36 to increase the intensity of the electric field E. The intensity of the electric field E may be inversely proportional to the square of the distance.

The branch waveguide 36 may have a first width W1 less than the second distance D2. For example, the first width W1 may be about 0.5 µm to about 1.5 µm. For example, the first width W1 may be about 1 µm. The branch waveguide 36 and each of the ferroelectric blocks 40 may have the same thickness T as each other. For example, the branch waveguide 36 and each of the ferroelectric blocks 40 may have the thickness of about 100 nm or less.

Figure 5:
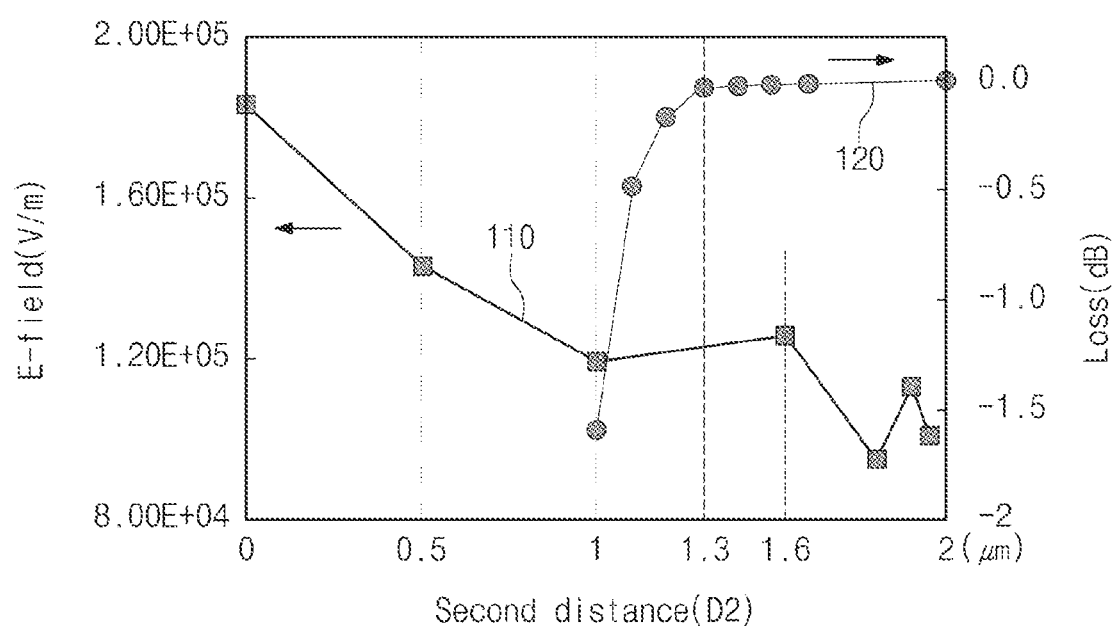
FIG. 5 is a graph showing an intensity of an electric field and a loss of an optical signal based on a second distance of FIG. 4.

FIG. 5 is a graph showing an intensity 110 of the electric field E and a loss 120 of the optical signal 31 based on the second distance D2 of FIG. 4.

Referring to FIG. 5, the intensity 110 of the electric field E is inversely proportional to the second distance D2, and the loss 120 of the optical signal 31 may minimally decrease with the second distance D2 of about 1.3 µm or more. When the second distance D2 increases from about 1.3 µm to about 1.6 µm, the intensity 110 of the electric field E may increase, and the loss 120 of the optical signal 31 may be about 0. When the second distance D2 is less than about 1.3 µm, the intensity of the electric field E may increase. However, the loss 120 of the optical signal 31 may increase to about 0 to about −1.5 dB. When the second distance D2 is greater than about 1.6 µm, the loss 120 of the optical signal 31 may be about 0. On the other hand, the intensity 110 of the electric field E may decrease. Thus, the electro-optic modulator 100 according to an embodiment of the inventive concept may increase the intensity 110 of the electric field E and minimize the loss 120 of the optical signal 31 to about 0 by using the ferroelectric blocks 40 having the second distance D2 of about 1.3 µm to about 1.6 µm.

Referring to FIG. 4 again, each of the ferroelectric blocks 40 may have a protruding portion 42 having a top surface exposed from the signal electrode 52 and the ground electrode 54. The protruding portion 42 may be disposed between the signal electrode 52 and the branch waveguide 36. The protruding portion 42 may be disposed between the ground electrode 54 and the branch waveguide 36. The protruding portion 42 may decrease the first distance D1 between the signal electrode 52 and the ground electrode 54 with respect to the branch waveguide 36 to increase the intensity of the electric field E. Alternatively, the protruding portion 42 may concentrate a charge of each of the signal electrode 52 and the ground electrode 54 to increase the intensity of the electric field E. Furthermore, the protruding portion 42 may concentrate the optical signal 31 in the branch waveguides 36. For example, the protruding portion 42 may have a second width W2 corresponding to a difference between the first distance D1 and the second distance D2. For example, the second width W2 may be about 0.4 µm to about 0.7 µm.

Figure 6:
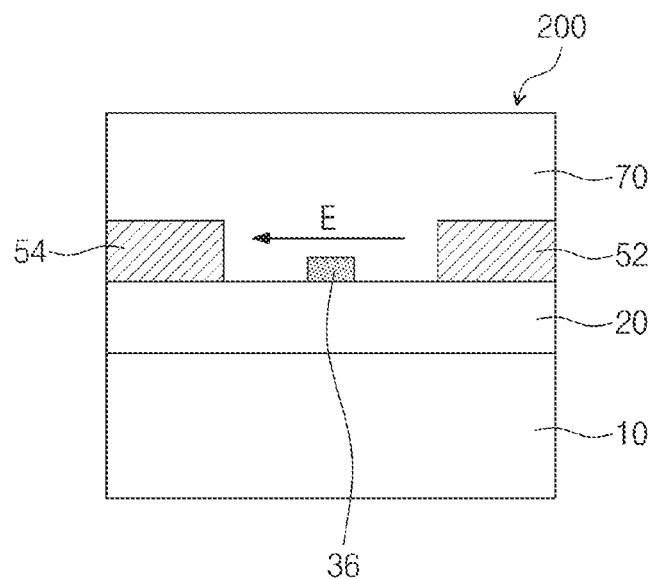
FIG. 6 is a view illustrating a first general electro-optic modulator.

FIG. 6 is a view illustrating a first general electro-optic modulator 200.

Referring to FIG. 6, the first general electro-optic modulator 200 may not include the ferroelectric blocks 40 of FIG. 3. A substrate 10, a lower clad layer 20, a branch waveguide 36, a signal electrode 52, a ground electrode 54, and an upper clad layer 70 may be configured as same as those of FIG. 4.

Figure 7:
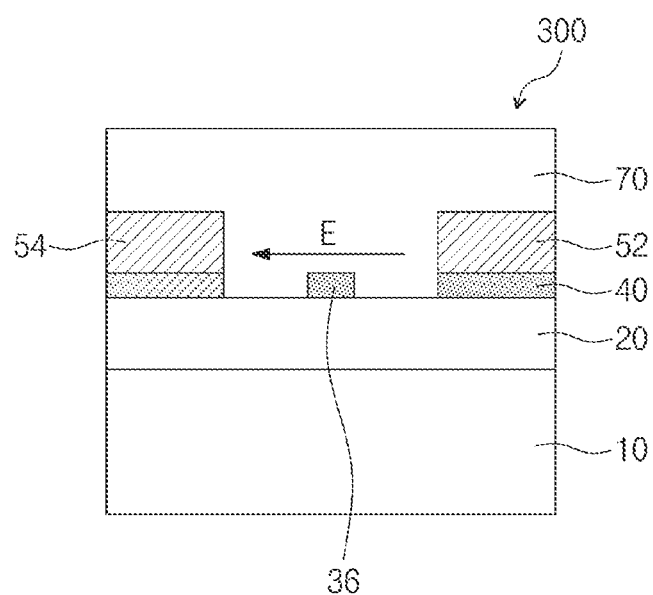
FIG. 7 is a view illustrating a second general electro-optic modulator.

FIG. 7 is a view illustrating a second general electro-optic modulator 300.

Referring to FIG. 7, the second general electro-optic modulator 300 may include ferroelectric blocks 40 aligned to a signal electrode 52 and ground electrodes 54. The ferroelectric blocks 40 may be aligned to the signal electrode 52 and the ground electrode 54 to serve as an insulation layer. The ferroelectric blocks 40 may increase a distance between the signal electrode 52 and the branch waveguide 36 to decrease an intensity of an electric field E with respect to the branch waveguide 36. In the same manner, the ferroelectric blocks 40 may increase a distance between the ground electrode 54 and the branch waveguide 36 to decrease the intensity of an electric field E with respect to the branch waveguide 36. A substrate 10, a lower clad layer 20, and an upper clad layer 70 may be configured as same as those of FIG. 4.

Figure 8:
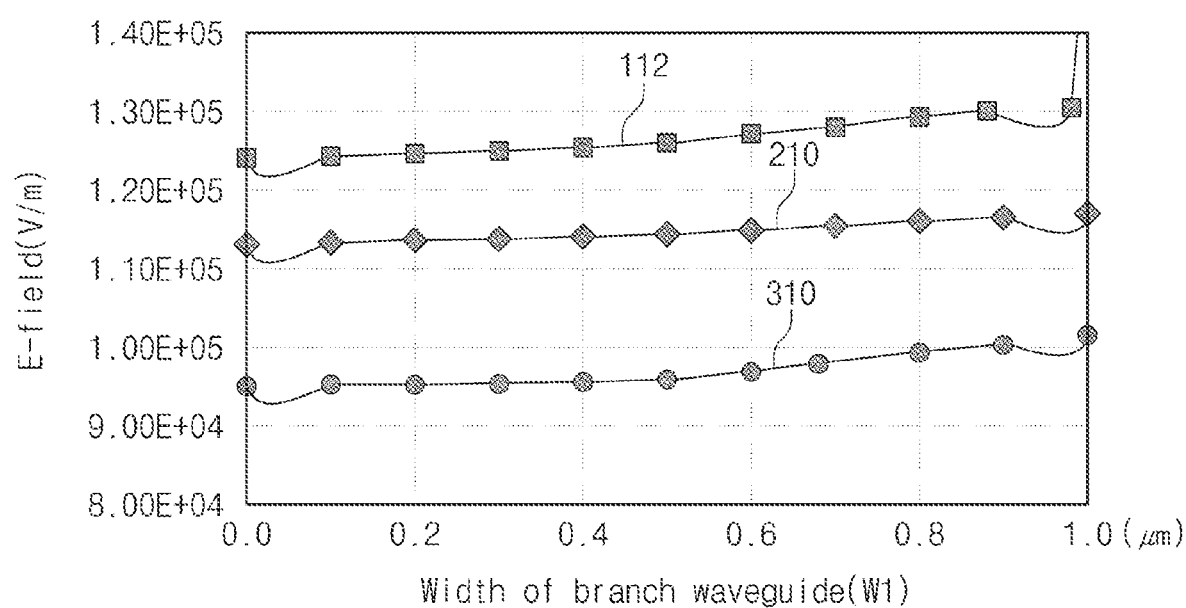
FIG. 8 is a graph showing a first electric field intensity of the electro-optic modulator according to an embodiment of the inventive concept, a second electric field intensity of the first general electro-optic modulator, and a third electric field intensity of the second general electro-optic modulator.

FIG. 8 is a graph showing a first electric field intensity 110 of the electro-optic modulator 100 according to an embodiment of the inventive concept, a second electric field intensity 210 of the first general electro-optic modulator 200, and a third electric field intensity 310 of the second general electro-optic modulator 300. Here, a horizontal axis represents the first width W1 of the branch waveguide 36, and a vertical axis represents the intensity of the electric field E1.

Referring to FIG. 8, the first electric field intensity 112 of the electro-optic modulator 100 according to an embodiment of the inventive concept may be greater than each of the second electric field intensity 210 of the first general electro-optic modulator 200 and the third electric field intensity 310 of the second general electro-optic modulator 300 in the branch waveguide 36. Thus, the electro-optic modulator 100 according to an embodiment of the inventive concept may obtain the first electric field intensity 112 greater than each of the second and third electric field intensities 210 and 310 of the first and second general electro-optic modulators 200 and 300 by using the protruding portion 42 of each of the ferroelectric blocks 40.

Referring to FIGS. 1 and 2 again, the DC electrodes 60 may be disposed on the DC region 16. The DC electrodes 60 may be respectively disposed at both the outer sides of one of the branch waveguides 36. The DC electrodes 60 may be arranged in parallel to the branch waveguides 36. For example, the DC electrodes 60 may be arranged in the first direction Y. The DC electrodes 60 may be disposed on the lower clad layer 20. When a DC bias voltage (not shown) is provided between the DC electrodes 60, the DC electrodes 60 may induce an electric field to one of the branch waveguides 36 to remove an offset of the phase difference of the optical signal 31 in the branch waveguides 36. For example, the DC electrodes 60 may remove the offset of the phase difference of about ±1° by using the DC bias voltage.

Referring to FIGS. 2 and 3, the upper clad layer 70 may be disposed on the CPW traveling-wave electrodes 50, the optical waveguide 30, the DC electrodes 60, and the lower clad layer 20. The upper clad layer 70 may have a refractive index less than that of the optical waveguide 30. For example, the upper clad layer 70 may include a silicon oxide.

The line electrodes 80 may be disposed on the upper clad layer 70. The line electrodes 80 may be connected to the CPW traveling-wave electrodes 50 and the DC electrodes 60 by first contact plugs 86 and second contact plugs 88. The line electrodes 80 may include first line electrodes 82 and second line electrodes 84.

The first line electrodes 82 may be disposed in the input region 12 and the radio frequency region 14. The first line electrodes 82 may be respectively disposed on both sides of the CPW traveling-wave electrodes 50. The first line electrodes 82 may be respectively connected to the both sides of the CPW traveling-wave electrodes 50 by the first contact plugs 86. One portion of the first line electrodes 82 may be connected to the ground electrodes 54 and grounded. The other portion of the first line electrodes 82 may be connected to the signal electrode 52 and provide the RF signal 92 to the signal electrode 52. Each of the first line electrodes 82 may have a linear structure of extending and/or arranging in the first direction Y without being bent. The first line electrodes 82 may minimize and remove noise of the RF signal 92.

The second line electrodes 84 may be disposed in the DC region 16 and the output region 18. The second line electrodes 84 may be respectively connected to the DC electrodes 60 by the second contact plugs 88. The second line electrodes 84 may provide a DC voltage (not shown) to the DC electrodes 60.

The resistors 90 may be connected between the first line electrodes 82 each disposed at one side of each of the CPW traveling-wave electrodes 50. When the RF signal 92 is provided to a portion of the first line electrodes 82 each disposed at the other side of each of the CPW traveling-wave electrodes 50, the resistors 90 may match impedances of the signal electrode 52 and the ground electrodes 54 to remove a reflective wave of the RF signal 92.

As described above, the electro-optic modulator according to the embodiment of the inventive concept may increase the intensity of the electric field provided to the optical waveguide by using the ferroelectric blocks respectively disposed at the both sides of the optical waveguides and having a distance closer to the optical waveguide than the electrode.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An electro-optic modulator comprising:
   a lower clad layer disposed on a substrate;
   an optical waveguide disposed on the lower clad layer;
   traveling-wave electrodes respectively disposed on both sides of the optical waveguide, each of the traveling-wave electrodes having a first distance to the optical waveguide; and
   ferroelectric blocks disposed between the traveling-wave electrodes and the lower clad layer, each of the ferroelectric blocks having a second distance less than the first distance with respective to the optical waveguide.

2. The electro-optic modulator of claim 1, wherein each of the ferroelectric blocks has a protruding portion having a top surface exposed from each of the traveling-wave electrodes.

3. The electro-optic modulator of claim 2, wherein the protruding portion has a first width corresponding to a difference between the first distance and the second distance.

4. The electro-optic modulator of claim 3, wherein the first width is about 0.4 μm to about 0.7 μm.

5. The electro-optic modulator of claim 1, wherein the first distance is about 1.5 μm to about 2.5 μm, and the second distance is about 1.3 μm to about 1.6 μm.

6. The electro-optic modulator of claim 1, wherein the optical waveguide has a second width less than the second distance.

7. The electro-optic modulator of claim 6, wherein the second width is about 0.5 μm to about 1.5 μm.

8. The electro-optic modulator of claim 1, wherein each of the optical waveguide and the ferroelectric blocks comprises $LiNbO_3$.

9. The electro-optic modulator of claim 1, wherein the optical waveguide comprises:
   an input waveguide;
   an output waveguide disposed opposite to the input waveguide; and branch waveguides that are branched from the input waveguide and coupled to the output waveguide, wherein the ferroelectric blocks are disposed between the branch waveguides, each of the ferroelectric blocks respectively disposed at both sides of the branch waveguides.

10. The electro-optic modulator of claim 9, wherein the traveling-wave electrodes comprise:

a signal electrode disposed between the branch waveguides; and ground electrodes respectively disposed at both outer sides of the branch waveguides.

11. The electro-optic modulator of claim 10, further comprising an upper clad layer disposed on the traveling-wave electrodes, the ferroelectric blocks, and the optical waveguide.

12. The electro-optic modulator of claim 11, further comprising direct current (DC) electrodes disposed adjacent to the traveling-wave electrodes, the DC electrodes respectively disposed at both sides of one of the branch waveguides.

13. The electro-optic modulator of claim 12, further comprising line electrodes disposed on the upper clad layer, wherein the line electrodes comprise:

first line electrodes connected to the signal electrode and the ground electrodes; and second line electrodes connected to the DC electrodes.

14. The electro-optic modulator of claim 13, further comprising resistors disposed on the first line electrodes and configured to connect the signal electrode with the first line electrodes each disposed at one side of each of the ground electrodes.

15. The electro-optic modulator of claim 13, wherein the traveling-wave electrodes each extend in a first direction, and each of the first line electrodes has a linear structure extending in the first direction.

16. The electro-optic modulator of claim 9, wherein the optical waveguide comprises:

an optical splitter disposed between the input waveguide and the branch waveguides; and an optical coupler disposed between the branch waveguides and the output waveguide.

\* \* \* \* \*